(12) United States Patent
Abraham et al.

(10) Patent No.: US 12,494,657 B2
(45) Date of Patent: Dec. 9, 2025

(54) SYSTEMS AND METHODS FOR BATTERY CELL DEGRADATION DETECTION

(71) Applicant: Ford Global Technologies, LLC, Dearborn, MI (US)

(72) Inventors: Patterson Abraham, Dearborn, MI (US); Ai Keramidas, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 18/462,270

(22) Filed: Sep. 6, 2023

(65) Prior Publication Data

US 2025/0079862 A1    Mar. 6, 2025

(51) Int. Cl.
| | |
|---|---|
| *H02J 7/00* | (2006.01) |
| *G01R 31/3835* | (2019.01) |
| *G01R 31/392* | (2019.01) |
| *G01R 31/396* | (2019.01) |
| *G08B 21/18* | (2006.01) |

(52) U.S. Cl.
CPC .......... *H02J 7/005* (2020.01); *G01R 31/3835* (2019.01); *G01R 31/392* (2019.01); *G01R 31/396* (2019.01); *G08B 21/182* (2013.01); *H02J 7/0013* (2013.01); *H02J 2207/20* (2020.01)

(58) Field of Classification Search
None
See application file for complete search history.

(56) References Cited

U.S. PATENT DOCUMENTS

| | | | |
|---|---|---|---|
| 7,528,571 B2 | 5/2009 | Kernahan et al. | |
| 8,581,547 B2 | 11/2013 | Hoff | |
| 8,917,060 B2 | 12/2014 | Shigemizu et al. | |
| 9,840,161 B2 | 12/2017 | Chikkannanavar et al. | |
| 10,335,906 B2 | 7/2019 | Pham | |
| 2008/0143292 A1* | 6/2008 | Ward | B60L 8/003 320/101 |
| 2010/0066379 A1* | 3/2010 | Iida | H02J 7/005 324/434 |
| 2010/0156355 A1* | 6/2010 | Bauerle | H02J 7/007194 320/152 |
| 2010/0327809 A1 | 12/2010 | Takaoka et al. | |
| 2020/0144842 A1* | 5/2020 | Ha | H02J 7/0047 |
| 2021/0305820 A1* | 9/2021 | Ikeda | H02J 7/00712 |
| 2023/0018810 A1 | 1/2023 | Li et al. | |

FOREIGN PATENT DOCUMENTS

| | | |
|---|---|---|
| JP | 2018014817 A | 1/2018 |
| WO | 2021169486 A1 | 9/2021 |

* cited by examiner

*Primary Examiner* — Jas A Sanghera
(74) *Attorney, Agent, or Firm* — David Kelley; McCoy Russell LLP (57) ABSTRACT

Methods and systems are provided for a high-voltage multi-array battery of a plug-in vehicle. In one example, a method may include monitoring a rate of change of a difference in a maximum cell voltage deviation for at least one array of cells of the high-voltage multi-array battery exceeding a predetermined threshold. In response to the rate of change exceeding the predetermined threshold, plug-in charging is aborted and a diagnostic trouble code (DTC) is recorded in a memory of the vehicle.

19 Claims, 5 Drawing Sheets

SYSTEMS AND METHODS FOR BATTERY CELL DEGRADATION DETECTION

FIELD

The present description relates generally to methods and systems for detecting degradation of a high-voltage multi-array battery during plug-in charging of the high-voltage multi-array battery.

BACKGROUND/SUMMARY

Traction batteries such as lithium (Li) ion batteries are an integral component of hybrid-electric, plug-in hybrid-electric, and battery electric vehicles (HEV, PHEV, and BEVs, respectively). Batteries are typically constructed of one or more arrays having multiple individual battery cells in which the battery cells are designed to operate for a specified timeframe, typically multiple years or specified number of miles of usage. The traction battery provides power for vehicle propulsion and accessory features. During operation, the traction battery may be charged or discharged based on operating conditions. Detection of any premature degradation or loss of function of a battery cell in the battery pack is desired to provide an alert to a user such that the battery may be serviced prior to potential further degradation or loss of functionality. Degradation or loss of function may be caused by multiple mechanisms, including a high resistance internal short, a low resistance internal short, and Li plating on components inside a battery cell. Another mechanism of excess capacity loss includes accelerated chemical changes inside a battery cell. The detection of battery cell degradation by conventional means has not been reliable, and the nature of cell degradation events along with a relatively low rate of degradation poses challenges for unambiguous detection.

Attempts to address battery cell degradation include monitoring a voltage rate of change at a battery cell level. One example approach is shown by Chikkannanavar et al. in U.S. Pat. No. 9,840,161. Therein, a battery management system includes a controller configured to, in response to a rate of change of voltage during discharge of a battery cell exceeding a first threshold more than a predetermined number of times over a predefined duration, output an error signal. Further, Chikkannanavar et al. show a vehicle battery management system including a controller configured to, in response to a rate of change of voltage of a battery cell exceeding a first threshold while partially discharging the battery cell during a recharge event, or in response to a number of instances in which the rate of change exceeds a second threshold which is less than the first threshold exceeding a count threshold, output an error signal.

However, the inventors herein have recognized potential issues with such systems. As one example, systems which monitor battery cell degradation at a battery cell level may be computation intensive for a processor performing calculations to identify changes in voltage of the battery cell with respect to another parameter such as time, state of charge, and so on. For example, if done at a battery cell level where a calculation is performed for each battery cell, calculations for a battery pack having 192 cells in series would include 192 calculations. In addition to being computation intensive, this method of calculation may take an overly long duration of time, for example, time in which battery cells of the battery pack are being further degraded. Alternatively, performing calculations to detect changes in voltage of cells on an array level or a battery level may make capturing individual battery cell degradations challenging. For example, a drop in battery cell voltage of a single battery cell of an array or battery may not necessarily be identified in a 400 V-800 V battery. Additionally, calibrating a calculation method for a high-voltage battery (e.g., 400 V-800 V) may be challenging due to the size and power of the high-voltage battery. Thus, a method is desired for detecting abnormal changes in voltages of battery cells of a multi-celled battery pack which decreases a number of computations and decreases a time taken to detect abnormal changes while maintaining or improving an accuracy of detection of degradation on a battery-cell level.

In one example, the issues described above may be addressed by a method during plug-in charging of a high-voltage multi-array battery of a vehicle, the method comprising, in response to a rate of change of a difference in a maximum cell voltage deviation for at least one array of cells of the high-voltage multi-array battery exceeding a predetermined threshold, aborting plug-in charging and recording a diagnostic trouble code (DTC) in a memory of the vehicle. In this way, a time between a cell degradation or loss of function event and detection of the event, which may further reduce time between the event and response thereto, compared to conventional methods.

As one example, the rate of change of the difference in the maximum cell voltage deviation for an array of cells is a difference between an instantaneous maximum cell voltage deviation and a historic moving average of a maximum cell voltage deviation for the array of cells. The instantaneous maximum cell voltage deviation may be calculated by identifying an instantaneous voltage of each battery cell of the array (e.g., each identified at the same time), identifying a first battery cell and a second battery cell of the array which have a maximum and a minimum voltage, respectively, of the instantaneous voltages, and calculating an average voltage of the array, excluding voltages of the first battery cell and the second battery cell. The historic moving average may be calculated in a similar fashion to calculation of the instantaneous maximum cell voltage deviation for a time period preceding the time at which the instantaneous voltages are collected. The predetermined threshold may be a non-zero positive value of a rate of change of a difference in a maximum cell voltage deviation for an array of cells at or above which degradation of one or more battery cells of the array may occur. For example, the value of the rate of change may be greater than a rate of change at which the battery cells are configured to charge, thus when the rate of change of the difference in the maximum cell voltage deviation for an array of cells exceeds the predetermined threshold, it may indicate that the voltage of one or more battery cells is changing faster or slower than is desired, which may be indicative of degradation or loss of function of the respective battery cell(s). Furthermore, a rate of change of battery current criteria can be introduced so that the rate of change of maximum cell voltage deviation detection can be more accurate.

By calculating an instantaneous maximum cell voltage deviation and a historic moving average of a maximum cell voltage deviation for an array of battery cells as opposed to for each battery cell of an array, the method described herein reduces a computational demand on a processor, increases a computational speed, and decreases a time of detection for degradation of one or more battery cells. Rather than computing a derivative of a cell voltage of each battery cell of an array of the high-voltage multi-array battery, the methods described herein include computing the rate of change of the difference in the maximum cell voltage deviation of each array. By detecting such changes in cell voltage during charging of the high-voltage multi-array battery, cell degradation and/or loss of cell function may be anticipated, and operation of the high-voltage multi-array battery (e.g., plug-in charging operations) may be adjusted to reduce further degradation of the battery cell(s).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
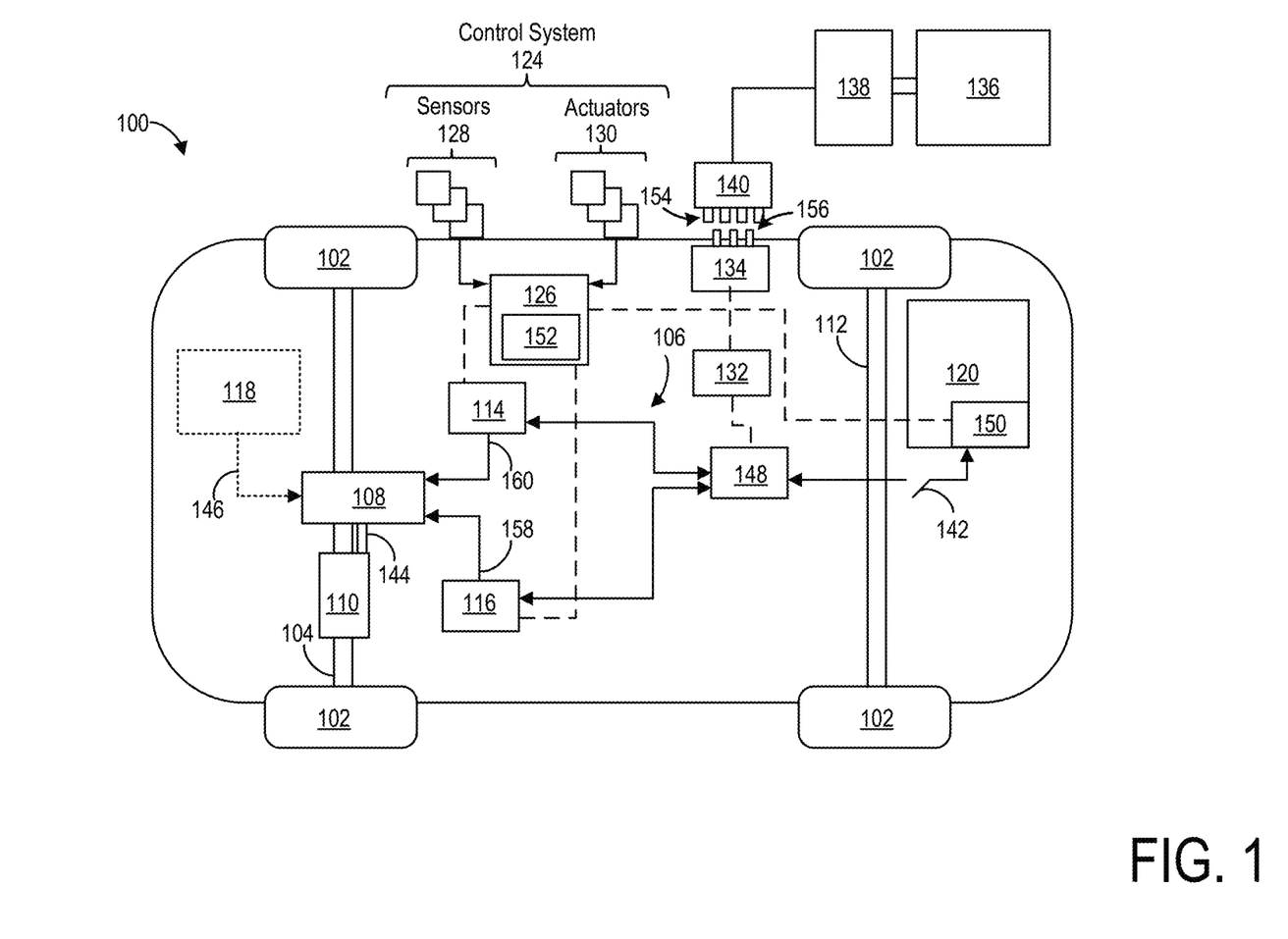
FIG. 1 shows a schematic representation of a plug-in vehicle having a high-voltage multi-array battery.
Figure 2:
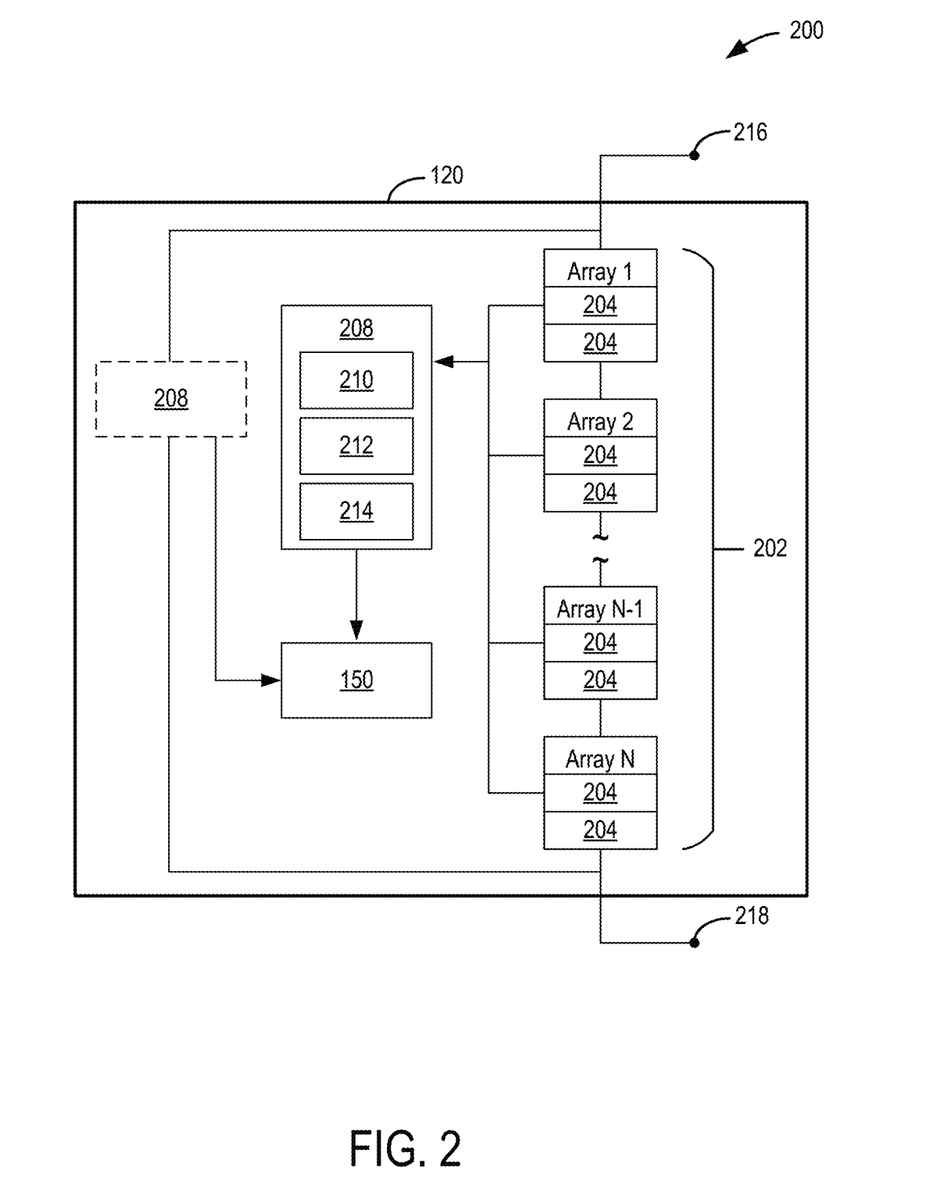
FIG. 2 shows a schematic representation of a high-voltage multi-array battery.
Figure 3:
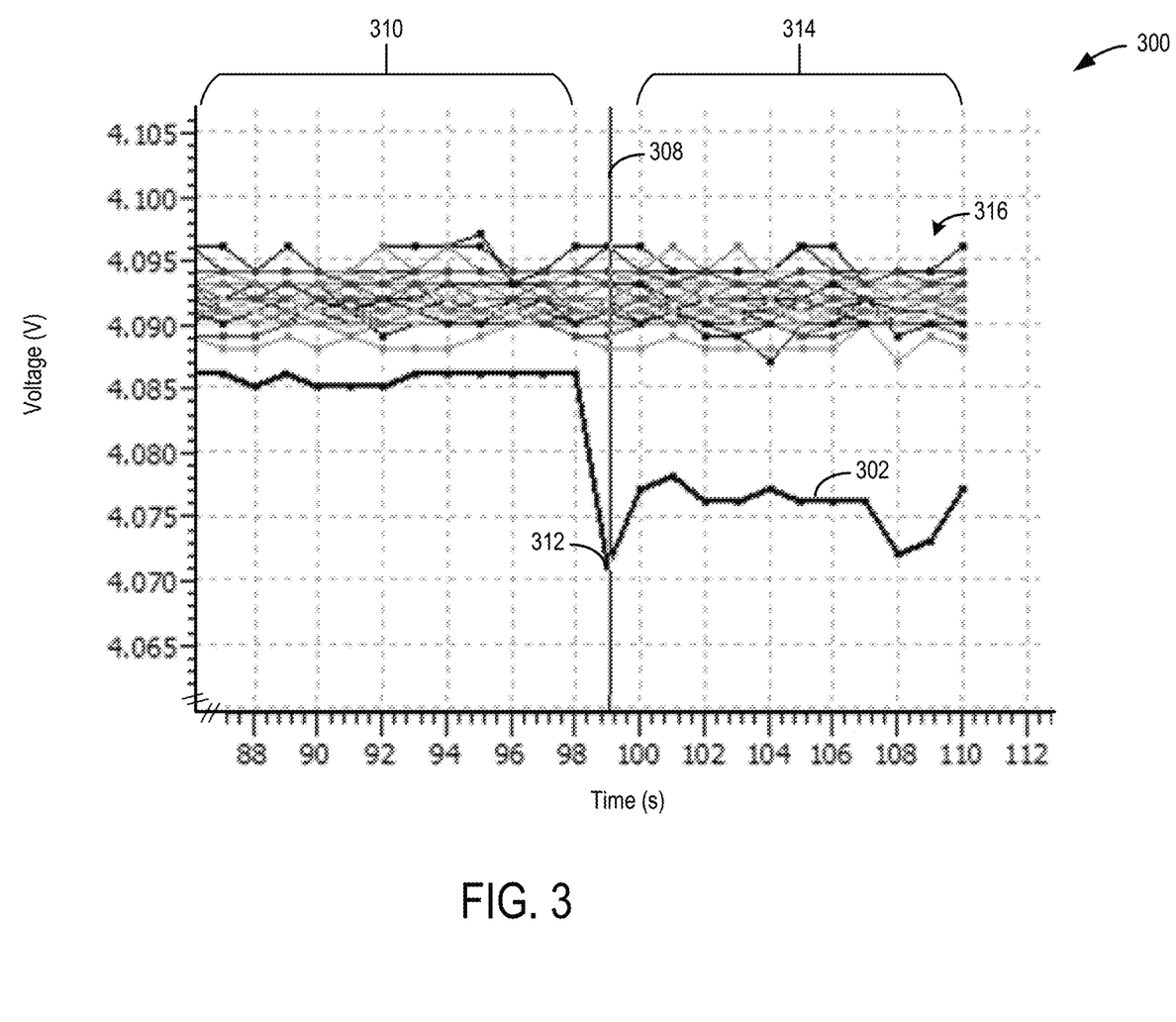
FIG. 3 shows a graph of changes in voltage over time for battery cells of a high-voltage multi-array battery.
Figure 4:
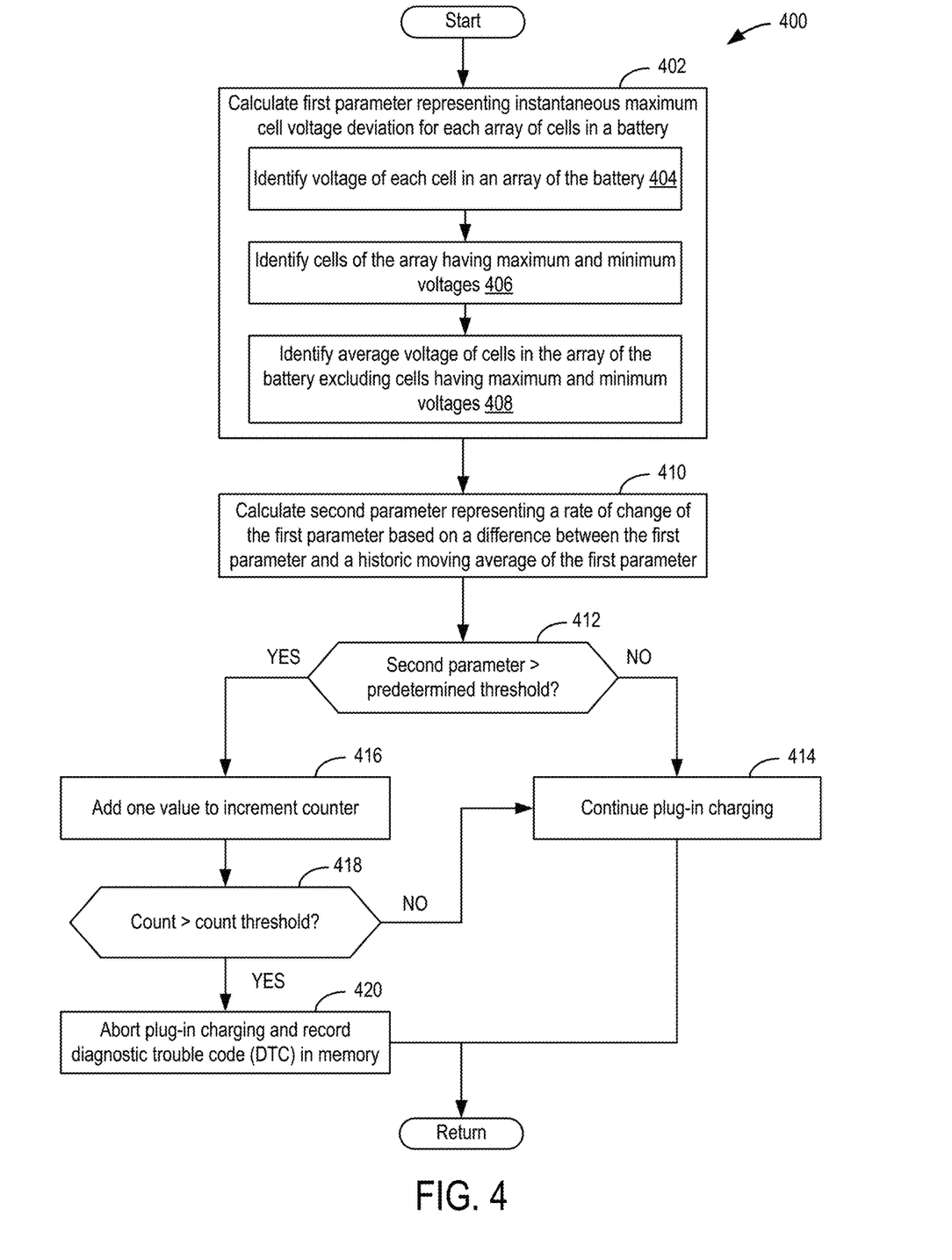
FIG. 4 shows a flow chart for a method for plug-in charging of a high-voltage multi-array battery.
Figure 5:
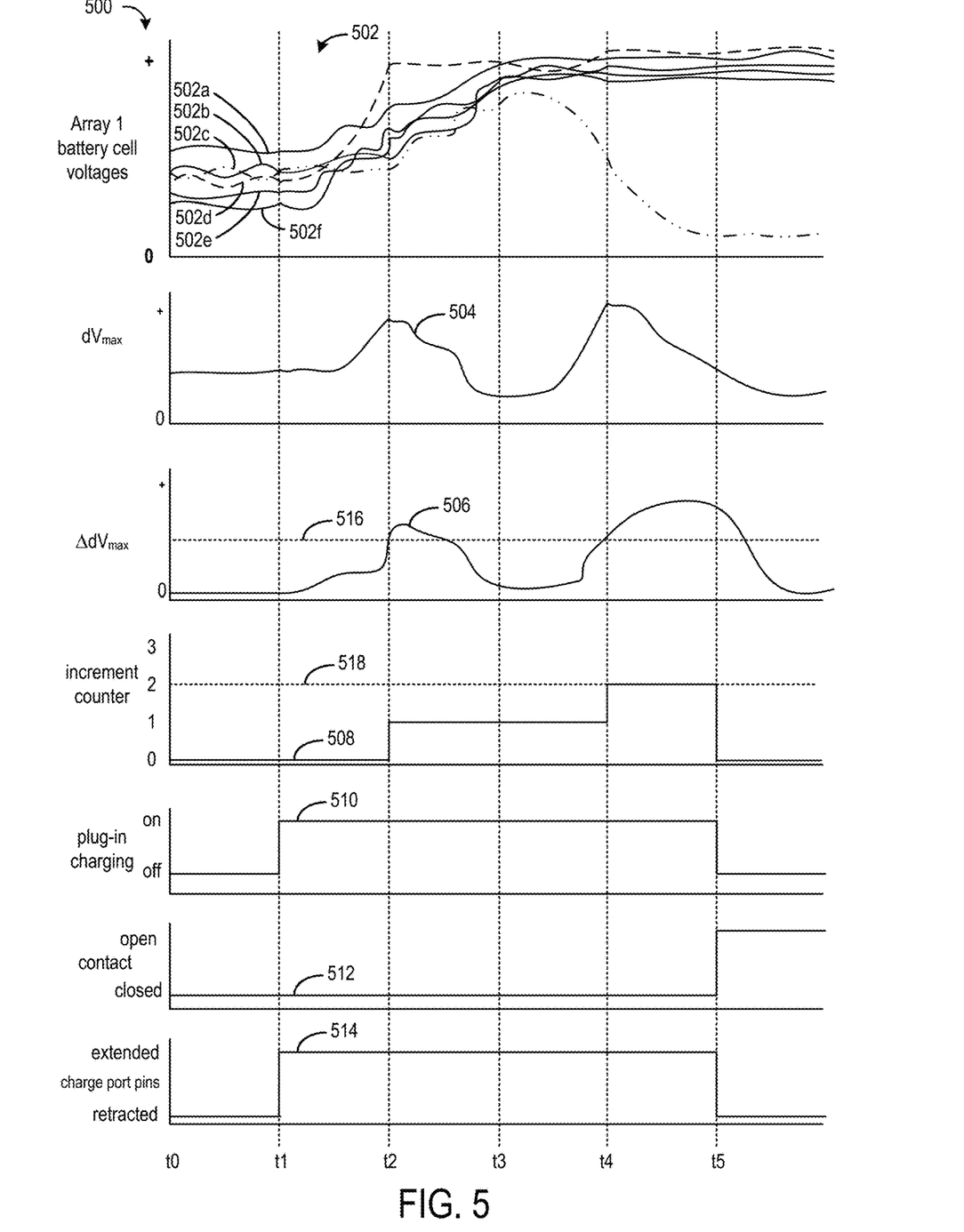
FIG. 5 shows a timing diagram of operation of a high-voltage multi-array battery according to the method of FIG. 4.

The following description relates to systems and methods for detecting degradation of a battery cell of a high-voltage multi-array battery by monitoring a rate of change of a difference in a maximum cell voltage deviation for at least one array of cells of the high-voltage multi-array battery. The high-voltage multi-array battery may be integrated in and used to power drive and auxiliary functions of a plug-in vehicle, an example of which is shown in FIG. 1. The high-voltage multi-array battery, and thus battery cells (herein also "cells") thereof may be charged (e.g., increase a cell state of charge) via a plug-in charging operation. An example schematic of a high-voltage multi-array battery, such as may be used in the plug-in vehicle of FIG. 1, is shown in FIG. 2. The high-voltage multi-array battery includes multiple battery cells arranged in multiple arrays, as well as sensor modules and a battery energy control module (BECM) used to monitor voltages of each battery cell. FIG. 3 shows a graph illustrating changes in cell voltages of multiple battery cells of an array over time. An embodiment of a method for detecting degradation of a battery cell of a high-voltage multi-array battery by monitoring a rate of change of a difference in a maximum cell voltage deviation for at least one array of cells of the high-voltage multi-array battery is shown in FIG. 4. The method described herein includes aborting plug-in charging and recording a diagnostic trouble code (DTC) in response to the rate of change of a difference in a maximum cell voltage deviation for at least one array of cells exceeding a predetermined threshold rate of change. A timing diagram shown in FIG. 5 illustrates operation of the high-voltage multi-array battery in the plug-in vehicle, including abortion of a plug-in charging operation in response to the rate of change of a difference in a maximum cell voltage deviation for at least one array of cells exceeding the predetermined threshold rate of change.

FIG. 1 depicts a schematic representation of a plug-in vehicle 100. The plug-in vehicle 100 may be a plug-in electric vehicle wherein propulsion of the plug-in vehicle 100 is powered by one or more electric machines using power stored by a traction battery. In other embodiments, the plug-in vehicle 100 may be a plug-in hybrid-electric vehicle comprising an engine as a rotational power source in addition to one or more electric machines using power stored by a traction battery. It will be appreciated that the plug-in vehicle 100 is shown in FIG. 1 for illustrative purposes and is a non-limiting example of how a plug-in vehicle may be configured. Other examples include various arrangements and positioning of components of the plug-in vehicle 100 described below as well as additional components not shown in FIG. 1 for brevity.

A drive train 106 of the plug-in vehicle 100 may include a transmission 108 (e.g., a gear box, gear train, etc.) coupled to one or more of a front axle 104 and a rear axle 112 of the plug-in vehicle 100. Each of the front axle 104 and the rear axle 112 may have a pair of wheels 102 positioned thereon and coupled thereto. The transmission 108 may be mechanically coupled to a final drive 110 of the drive train 106 which, for example, may be a differential or any other suitable gearing. The transmission 108 and final drive 110 may together translate speed and torque from a rotating source to the pairs of wheels 102 coupled to each of the front axle 104 and the rear axle 112 to propel the plug-in vehicle 100. The present configuration includes at least two transmission input shafts, including a first transmission input shaft 160 coupling a first electric machine 114 and the transmission 108, and a second transmission input shaft 158 coupling a second electric machine 116 and the transmission 108. Collectively, the first electric machine 114 and the second electric machine 116 may be referred to herein as the electric machines. In other embodiments, the plug-in vehicle 100 may include more than or less than two electric machines without departing from the scope of the present disclosure. Additionally, the transmission 108 may be mechanically coupled to the final drive 110 via an output gear set 144. In off-highway vehicle applications, a prop-shaft (not shown) may be included to mechanically couple output of the transmission to input of the axle, such as the front axle 104 and/or the rear axle 112.

When configured as a plug-in electric vehicle, the rotating sources of the plug-in vehicle 100 may be the first electric machine 114 and the second electric machine 116. In some examples, and as described herein, the first electric machine 114 and the second electric machine 116 may be motor/generators, with a capacity to convert electrical energy into mechanical energy and vice versa. As such, the electric machines may hereafter also be referred to as motors and/or generators. The electric machines may be similarly configured, e.g., having similar operational speed and torque ranges, and thereby referred to as symmetric, or may have different speed and torque outputs, thereby referred to as asymmetric. The first electric machine 114 and the second electric machine 116 may be electrically coupled to a traction battery, for example, a high-voltage multi-array (HVMA) battery 120 of the plug-in vehicle 100 to both draw power from the HVMA battery 120 and provide electrical energy to be stored at the HVMA battery 120. For example, the HVMA battery 120 may be electrically coupled to one or more power electronics modules 148. The power electronics module 148 may also be electrically coupled to the first electric machine 114 and the second electric machine 116 and provides an ability to bi-directionally transfer energy between the HVMA battery 120 and the electric machines.

The HVMA battery 120 may have a capacity of 400 V to 800 V and include multiple battery arrays, each of which includes at least two battery cells. One or more contactor 142 may isolate the HVMA battery 120 from other components when opened and connect the HVMA battery 120 to other components when closed. In some embodiments, the HVMA battery 120 may provide a high voltage direct current (DC) output to the first electric machine 114 and/or the second electric machine 116 when the contactor 142 is closed. For example, the HVMA battery 120 may provide a DC voltage while the electric machines may operate with a three-phase alternating current (AC) to function. The power electronics module 148 may convert the DC voltage to a three-phase AC current to operate the electric machines. In a regenerative mode, the power electronics module 148 may convert the three-phase AC current from the electric machines acting as generators to the DC voltage compatible with the HVMA battery 120. In addition to providing energy for propulsion, the HVMA battery 120 may provide energy for other vehicle electrical systems, such as auxiliary devices (e.g., electric heaters, entertainment devices, and so on) of the plug-in vehicle 100. Further detail regarding a high-voltage multi-array battery is described with respect to FIG. 2.

When configured as a plug-in hybrid-electric vehicle, the rotating sources of the plug-in vehicle 100 may be the first electric machine 114, the second electric machine 116, and an engine 118, such as an internal combustion engine. The engine 118 may be coupled to the transmission 108 to provide rotational energy thereto. For example, the plug-in vehicle 100 may further include a third transmission input shaft 146 coupling the engine 118 and the transmission 108. The first electric machine 114 and the second electric machine 116 may provide forward and reverse torque capabilities when the engine 118 is turned on or off. Operation of the engine 118 to provide power for vehicle propulsion may be supplemented by the first electric machine 114 and the second electric machine 116.

The HVMA battery 120 of the plug-in vehicle 100 may be recharged by an external power source 136. The external power source 136 may be a connection to an electrical outlet, or may be an electrical power distribution network or grid as provided by an electric utility company. The external power source 136 may be electrically coupled to a charger or other electric vehicle supply equipment (EVSE) 138. The EVSE 138 may provide circuitry and controls to control the transfer of energy between the power source 136 and the plug-in vehicle 100. The external power source 136 may provide DC or AC electric power to the EVSE 138. The EVSE 138 may have a charge connector 140 for plugging into a charge port 134 of the plug-in vehicle 100. The charge port 134 may be any type of port configured to transfer power from the EVSE 138 to the plug-in vehicle 100. The charge port 134 may be electrically coupled to a charger or an on-board power conversion module 132 of the plug-in vehicle 100. The power conversion module 132 may condition the power supplied from the EVSE 138 to provide the proper voltage and current levels to the HVMA battery 120. The power conversion module 132 may interface with the EVSE 138 to coordinate the delivery of power to the plug-in vehicle 100. The charge connector 140 may have a first set of pins 154 that mate with a second set of pins 156 of the charge port 134. In this way, the HVMA battery 120 may be charged using plug-in charging where the HVMA battery 120 is coupled to the external power source 136 via the charge port 134. Alternatively, various components described as being electrically coupled may transfer power using a wireless inductive coupling.

In some embodiments, the plug-in vehicle 100 may additionally or alternatively be configured to charge the HVMA battery 120 via inductive charging, where a charge connector is not plugged into the charge port to charge the HVMA battery 120. In these embodiments, the methods described herein may function similarly. For example, in response to a rate of change of a difference in a maximum cell voltage deviation for at least one array of cells of the high-voltage multi-array battery exceeding a predetermined threshold, a method for a vehicle configured to perform inductive charging may include aborting inductive charging and recording a diagnostic trouble code (DTC) in a memory of the vehicle Adjustment of the drive train 106 among various operating modes as well as control of operations within each mode may be executed based on a vehicle control system 124, including a controller 126. Controller 126 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. In one example, controller 126 may be a powertrain control module (PCM).

Controller 126 may receive various signals from sensors 128 coupled to various regions of the plug-in vehicle 100. For example, the sensors 128 may include sensors at the first electric machine 114 and the second electric machine 116 to measure motor speed and motor temperature, a pedal position sensor to detect a depression of an operator-actuated pedal, such as an accelerator pedal or a brake pedal, speed sensors at the vehicle wheels 102, and so on. Vehicle acceleration is directly proportional to accelerator pedal position, for example, degree of depression. Upon receiving the signals from the various sensors 128, the controller 126 processes the received signals, and employs various actuators 130 of the plug-in vehicle 100 to adjust drive train operations based on the received signals and instructions stored on a memory 152 (e.g., the electronic storage medium) of controller 126. For example, controller 126 may receive an indication of depression of the brake pedal, signaling a desire for decreased vehicle speed. In response, the controller 126 may command operation of at least one of the first electric machine 114 and the second electric machine 116 as a generator to recharge the HVMA battery 120. Additionally, as further described with respect to FIG. 4, monitoring battery cell degradation includes aborting plug-in charging and recording a diagnostic trouble code (DTC) in the memory 152 in response to the rate of change of a difference in a maximum cell voltage deviation for at least one array of cells exceeding a predetermined threshold. Aborting plug-in charging may include one or more of: controlling an actuator to open one or more contactor 142 to isolate the HVMA battery 120 from other components, and controlling an actuator to retract the second set of pins 156 of the charge port 134 to disconnect the plug-in vehicle 100 from the charge connector 140. As illustrated, aborting plug-in charging includes transitioning from a state where plug-in charging was actively occurring by stopping the plug-in charging and not plug-in charging.

As further described herein with respect to FIG. 2, the HVMA battery 120 may include a battery energy control module (BECM) 150 which may be positioned in the HVMA battery 120 and monitors battery cell voltage, battery current, and a battery cell temperature for each battery cell of each array of the HVMA battery 120. The BECM 150 may be communicably coupled to the controller 126 and further directly or indirectly control an amount of charge current going into and/or out of the HVMA battery 120. The BECM 150 may also be configured to run diagnostic checks to assess operational ability of the HVMA battery 120 during detection of cell degradation and/or loss of function. Such diagnostic tests may include analysis of changes in a voltage differential (e.g., change in battery voltage with respect to time, dV/dt), as described further with respect to FIGS. 3-5. For example, detecting a voltage signature such as a negative dV/dt spike during charging of the HVMA battery 120 may indicate degradation of a cell, such as a cell short.

Turning to FIG. 2, a schematic diagram 200 of the HVMA battery 120 is shown. The HVMA battery 120 may be constructed from a variety of chemical formulations, for example, lead acid, nickel-metal hydride (NIMH), or Lithium-ion (Li). In the embodiment shown in FIG. 2, the HVMA battery 120 includes a simple series configuration of N battery cell arrays 202. In other embodiments, the HVMA battery 120 may include any number of individual battery cell arrays connected in series, in parallel, or in some combination thereof. Each array of the N battery cell arrays 202 includes multiple battery cells 204. Each of the multiple battery cells 204 of a battery cell array may be similarly configured (e.g., having the same voltage capacity) or may have different configurations. Each array of the N battery cell arrays 202 may include the same number of battery cells or a different number of battery cells, and the battery cells of each array of the N battery cell arrays 202 may have the same or a different configuration with respect to battery cells of other arrays of the N battery cell arrays 202. The HVMA battery 120 further includes a positive terminal 216 and a negative terminal 218 which may couple the HVMA battery 120 to a powered element, such as the first electric machine 114 and the second electric machine 116 (e.g., via the power electronics module 148) and enabling the HVMA battery 120 to selectively provide power thereto.

The HVMA battery 120 includes a sensor module 208 for measuring and monitoring characteristics of the HVMA battery 120, such as temperature, current, and voltage. A single battery cell of an array may be the smallest structure configured to be directly measured and monitored by the sensor module 208. For example, a terminal voltage, current, and temperature of each cell of the multiple battery cells 204 may be measured using the sensor module 208. In some embodiments, the sensor module 208 includes additional modules for measuring specific characteristics of the multiple battery cells 204. For example, the HVMA battery 120 may further include one or more current measurement sensors 210, voltage measurement sensors 212, and temperature measurement sensors 214. The HVMA battery 120 may include additional sensor modules 208 configured to measure characteristics of the HVMA battery 120 at a battery level and/or at an array level. Sensors used to capture battery-level measurements and/or array-level measurements may be shared among the N battery cell arrays 202. In other embodiments, the HVMA battery 120 may include N sensor modules 208 (e.g., equal to the number of N battery cell arrays) to measure characteristics of battery cells in each array.

A battery management system which manages voltages of battery cells of the N battery cell arrays 202 as measured by the at least one sensor module 208 may include one or more controllers, such as the BECM 150. The BECM 150 may be communicably coupled to battery-level, array-level, and cell-level sensors of the HVMA battery 120 and to the controller 126 of the plug-in vehicle 100. Each of the at least one sensor modules 208 may transfer measurements to the BECM 150 for further processing and coordination. In some configurations, functionality of the sensor modules 208 may be incorporated internally to the BECM 150. For example, hardware of the sensor modules 208 may be integrated as part of the circuitry of the BECM 150 and the BECM 150 may process raw signals. The BECM 150 may further include non-volatile memory such that data may be retained when the BECM 150 is in an off condition, and retained data may be available upon the next on condition of the BECM 150. The BECM 150 may also include circuitry to interface with the one or more contactor 142 (e.g., of FIG. 1) to open and close the contactor 142.

FIG. 3 shows a graphical representation 300 of a profile 302 of a change in a voltage of a battery cell with respect to a change in time (dV/dt). Voltage is shown on a vertical axis and time is shown on a horizontal axis in seconds. The rate of change of voltage of the battery cell with respect to time (dV/dt) is plotted to produce the profile 302. The battery cell may be a battery cell of the multiple battery cells 204 of an array of the N battery cell arrays 202 of the HVMA battery 120, as described with respect to FIG. 2. The battery cell may be a single battery cell with a single anode and a single cathode, or may be a battery cell with multiple cathodes and multiple anodes in which the multiple cathodes and multiple anodes are coupled in parallel, in series, or in a combination thereof.

The profile 302 is captured during plug-in charging of the HVMA battery 120. Herein, the profile 302 illustrates an abrupt change in voltage of a battery cell occurring at time 308. The voltage of the battery cell may decrease from a first voltage range between 4.085 V and 4.090 V for a first duration 310 to a voltage minimum 312 at the time 308. The voltage of the battery cell may then partially rebound to a second voltage range between 4.075 V and 4.080 V for a second duration 314. The profile 302 may be monitored by the BECM 150 and/or the controller 126, as described with respect to FIGS. 1 and 2. As further described with respect to FIG. 4, the BECM 150 and/or the controller 126 may be configured to compare rates of changes of the profile 302 to a predetermined threshold rate of change. The predetermined threshold rate of change may be non-zero positive value derived from one or more battery cell characteristics, including a life of the battery cell, battery cell capacity, battery cell state of charge, battery cell current flow, battery cell chemistry, battery cell structure, and battery cell usage. For example, the predetermined threshold rate of change may be a maximum rate of change at which battery cells of the high-voltage multi-array battery are being continuously charged without overloading a voltage capacity of a battery cell.

The graphical representation 300 further includes multiple profiles 316 of voltages of additional battery cells with respect to time. The additional battery cells may be other battery cells of the same array as the battery cell profiled by the profile 302, or may be battery cells of different arrays in the same HVMA battery 120 of the battery cell profiled by the profile 302. Voltages of the additional battery cells as shown by the multiple profiles 316 are within a third voltage range between 4.085 V and 4.100 V for the duration of time shown in the graphical representation 300.

A voltage of a battery cell over time (e.g., V(t)) may be measured (e.g., by the sensor module 208 of FIG. 2) and recorded in a memory of a controller (e.g., the memory 152 of controller 126). As further described with respect to FIG. 4, voltages of each of the battery cells of an array may be used to determine a rate of change of a difference in a maximum cell voltage deviation for the array of cells. Behavior of the HVMA battery 120 may be adjusted, including aborting plug-in charging of the HVMA battery 120, in response to the determined rate of change of the difference in the maximum cell voltage deviation.

FIG. 4 shows a flow chart of a method 400 for monitoring for battery cell degradation based on a rate of change of a difference in a maximum cell voltage deviation for at least one array of cells of a high-voltage multi-array battery. In response to the rate of change of the difference in the maximum cell voltage deviation exceeding the predetermined threshold, plug-in charging is aborted and a diagnostic trouble code (DTC) is recorded in a memory. Instructions for carrying out the method 400 may be executed by a controller (e.g., the BECM 150 and/or the controller 126) based on instructions stored on a memory of the controller and in conjunction with signals received from sensors of the plug-in vehicle, such as the sensors described above with reference to FIG. 1. The controller may employ actuators of the plug-in vehicle to adjust high-voltage multi-array battery operation, according to the methods described below. The method 400 is described herein with respect to the plug-in vehicle 100 of FIG. 1, where the high-voltage multi-array battery may be the HVMA battery 120. The method 400 may be implemented in other high-voltage multi-array battery systems which are charged via plug-in charging, without departing from the scope of the present disclosure. The method 400 is executed during plug-in charging of the HVMA battery 120 when the plug-in vehicle 100 is an electric vehicle or a plug-in hybrid electric vehicle. Alternatively, when the plug-in vehicle 100 is a hybrid electric vehicle which is not coupled to an external power source for plug-in charging, the method 400 may be executed when a rate of change in battery current (di/dt) is low (e.g., the battery has a slow rate of discharge).

At 402, a first parameter representing an instantaneous maximum cell voltage deviation for each array of cells in a battery (e.g., the HVMA battery 120) is calculated. As described with respect to FIGS. 1-2, the HVMA battery 120 includes N battery cell arrays, each of which includes multiple battery cells. The method 400 may be used to identify degradation of the HVMA battery 120 at an array-level using measurements captured at a battery cell-level. At 404, a voltage of each battery cell of an array of the N battery cell arrays is captured. For example, the voltage of each battery cell may be captured by a sensor module (e.g., the sensor module 208) which is electrically coupled to one or more battery cells. In some embodiments, the sensor module 208 may be used to capture a voltage of a single battery cell, respective voltages of multiple battery cells of an array, and/or respective voltages of multiple battery cells from multiple arrays. In further embodiments, more than one sensor module 208 may be included in the HVMA battery 120. For example, the HVMA battery 120 may include N sensor modules corresponding to N battery cell arrays. Voltages for all battery cells of a first array may be captured and processed as described herein with respect to the method 400 before voltages of battery cells of additional arrays (e.g., a second array, an N array, and arrays therebetween) are captured, in some embodiments. In other embodiments, voltages of all battery cells of all arrays of the HVMA battery 120 may be captured at operation 404 and may be simultaneously processed according to the method 400.

Using the battery cell voltages captured at operation 404, battery cells of an array which have a maximum and a minimum voltage of the array are identified at 406. For example, a first cell which has a maximum voltage compared to voltages of all of the battery cells of the first array and a second cell which has a minimum voltage compared to voltages of all of the battery cells of the first array are identified. Following identification of battery cells of the array having the maximum and the minimum voltages, an average voltage of battery cells in the array is calculated, excluding voltages of the cells having the maximum and minimum voltages, at 408. For example, an average voltage of the first array is calculated by averaging all of the battery cell voltages captured at operation 404 except for those of the first cell and the second cell.

Using the battery cell voltages captured at operation 404 and the average voltage of the battery cells of the array calculated at operation 408, the first parameter representing an instantaneous maximum cell voltage deviation for an array of cells in a battery (e.g., the HVMA battery 120) is calculated. For example, the first parameter may be denoted as $dV_{max}$ and calculated according to equation 1:

$$dV_{max} = \text{abs}(\max(\text{Cell}nV - \text{Average of cells excluding max and min cell } V \text{ in the array})) \quad (1)$$

wherein "abs" is an absolute value function (e.g., |x|, where x is a positive or negative value), "max" is a maximum value function (e.g., identifies a maximum value in a dataset) and "CellnV" represents a dataset including voltages for each battery cell of the array (e.g., captured at operation 404). Equation 1 thus calculates a difference between the voltage of each battery cell of the array and the average voltage of battery cells of the array, excluding the maximum and minimum voltages as identified at operation 406, and identifies an absolute value of a maximum value of the differences. The "maximum value of the differences" identified using the max function may be a positive or a negative value (e.g., where the voltage of a battery cell is greater than or less than the average voltage of battery cells of the array, respectively), and the absolute value function provides the maximum value of differences as a positive number. Described another way, calculating the first parameter includes calculating a change maximum cell voltage deviation in an array of the HVMA battery 120 rather than calculating a derivative on each cell voltage of each cell of each array of cells of the HVMA battery 120. This may reduce a computational demand on the processor as well as reduce a detection time, as further described with respect to FIG. 5.

At 410, a second parameter is calculated, the second parameter representing a rate of change of the first parameter based on a difference between the first parameter and a historic moving average of the first parameter. Described another way, the second parameter is a rate of change of a difference in a maximum cell voltage deviation, denoted as $\Delta dV_{max}/dt$ and calculated according to equation 2:

$$\Delta dV_{max} = (dV_{max\_instantaneous} - dV_{max\_movingavg}) \quad (2)$$

wherein "$dV_{max\_instantaneous}$" is $dV_{max}$ calculated according to equation 1 and represents a change in the voltage at a particular instance (e.g., the instance at which the battery cell voltages are captured), and "$dV_{max\_movingavg}$" is a historic value of $dV_{max\_instantaneous}$. The historic value may be a value of $dV_{max\_instantaneous}$ which has been calculated in a previous execution of the method 400 and stored in the memory of the controller (e.g., the memory 152 of the controller 126). As further described with respect to FIG. 5, in some embodiments, $dV_{max\_movingavg}$ may be calculated during an execution of the method 400 using stored data of battery cell voltages for the respective array.

By solving for a rate of change of a difference in the maximum cell voltage deviation for an array of cells of the HVMA battery 120, degradation of one or more battery cells of the array may be identified. The second parameter is compared to a predetermined threshold rate of change at 412. The predetermined threshold rate of change may be, for example, non-zero positive value representing an expected rate of change of a difference in a maximum cell voltage deviation which is established using characteristics of the array, such as a number and a voltage capacity of battery cells of the array. The expected rate of change may reflect a rate at which a voltage of battery cells of the array increase during plug-in charging when plug-in charging is unimpeded by factors which may slow charging. Thus, when the rate of change of the difference in the maximum cell voltage deviation for at least one array of cells is high, there may be a greater than desired change in a charging rate, which may indicate degradation of one or more battery cells of the array. For example, the abrupt change in voltage occurring at time 308 in FIG. 3 may be 0.015 V/s. On average, the expected rate of change (e.g., the predetermined threshold) may be 0.001 V/s. Further examples of the rate of change exceeding the predetermined threshold are described with respect to FIG. 5.

At 412, it is determined whether or not the second parameter is greater than the predetermined threshold. In the example shown in FIG. 3, the second parameter (e.g., 0.015 V/s) exceeds the predetermined threshold (e.g., 0.001 V/s) at time 308. If the second parameter does not exceed the predetermined threshold, the method 400 proceeds to 414, where plug-in charging continues without being adjusted. The method 400 then returns to start to continuously monitor the rate of change of the difference in the maximum cell voltage deviation for arrays of the high-voltage multi-array battery.

If the second parameter is greater than the predetermined threshold at 412, the method 400 proceeds to 416 to add one value to a count of integers. An increment counter may add a count to the count of integers which is stored in the non-transitory memory of the controller (e.g., the memory 152 of the controller 126) each time the second parameter for an array of the high-voltage multi-array battery is determined to be greater than the predetermined threshold. In this way, the count of integers increases by one to track a number of times the rate of change of the difference in the maximum cell voltage deviation for an array of cells may indicate degradation of one or more battery cells.

At 418, the increment counter is referenced to determine if the count is greater than a count threshold. The count threshold may be a non-zero positive value integer which indicates a maximum number of occurrences that the second parameter is greater than the predetermined threshold before the array may be degraded. The count threshold may be set by a manufacturer, a user, and/or a distributer of the high-voltage multi-array battery and/or the system in which it is integrated. If the count is not greater than the count threshold at 418, the method 400 proceeds to 414 and plug-in charging continues unaltered.

If the count is greater than the count threshold at 418, the method proceeds to 420 to abort plug-in charging and record a diagnostic trouble code (DTC) in the memory of the controller. Aborting plug-in charging (e.g., aborting a plug-in charging operation) may include the controller sending a signal to one or more contactors (e.g., the one or more contactor 142) to open and isolate the HVMA battery 120 from other components of the system (e.g., the first electric machine 114 and the second electric machine 116). In some embodiments, aborting plug-in charging may additionally or alternatively include disconnecting the charge connector 140 from the charge port 134 of the plug-in vehicle 100, for example, by adjusting a configuration of the charge port (e.g., retracting the second set of pins 156 of the charge port 134 to not contact the first set of pins 154 of the charge connector 140) to disconnect the charge connector form the charge port. Aborting plug-in charging may further include adjusting operation of the power conversion module 132 to halt power supplied to the charge port 134 by the charge connector 140 from being delivered to the HVMA battery 120. Recording a DTC may further include outputting a notification to a display device, such as a dashboard or a heads up display of a vehicle (e.g., the plug-in vehicle 100), the notification indicating that plug-in charging has been aborted. Operations which are included in aborting plug-in charging may occur for a first duration of time, where the first duration of time may be configurable by a manufacturer and/or a user. For example, the configuration of the charge port may be adjusted to prevent connection of a charge connector to the charge port for a first duration of time.

In addition to aborting the plug-in charging and recording the DTC, in response to the count being greater than the count threshold, the controller may perform a battery power off event and may further enable a no-restart action for the HVMA battery 120. The no-restart action may include preventing the HVMA battery 120 from being powered on and/or from being charged via plug-in charging for a first duration of time, where the first duration of time is monitored by the controller. In some embodiments, following abortion of plug-in charging, the method further includes monitoring the HVMA battery 120 for a potential thermal event. For example, the rate of change of the difference in the maximum cell voltage deviation may exceed the predetermined threshold due to rapid charging of one or more battery cells, which may result in heating of the battery cell, the array, and/or the HVMA battery 120 to a temperature at which degradation due to excessive heat may occur. Thus, monitoring for a potential thermal event may include monitoring a temperature of the HVMA battery 120 via one or more temperature measurement sensors 214. For example, a temperature and a temperature rate of change of the HVMA battery 120 may be monitored and, in response to the temperature exceeding a temperature threshold and/or the temperature rate of change exceeding a temperature rate of change threshold, the controller may output a notification to a display device indicating a thermal event has occurred. Monitoring for a potential thermal event may further include outputting a notification to a display device (e.g., dashboard or a heads up display of the plug-in vehicle 100) indicating a demand for external thermal monitoring, such as using a thermal monitoring device which is external to and separate from the vehicle, and may be selectively coupled to the HVMA battery 120.

FIG. 5 shows a prophetic timing diagram 500 illustrating operation of a high-voltage multi-array battery of a vehicle (e.g., the HVMA battery 120 of the plug-in vehicle 100) wherein, in response to a rate of change of a difference in a maximum cell voltage deviation for at least one array of cells of the high-voltage multi-array battery exceeding a predetermined threshold, plug-in charging is aborted and a DTC is recorded in a memory of the vehicle. The control method used for operation of the high-voltage multi-array battery as shown in FIG. 5 may be the same as or similar to the series of actions described above with reference to method 400. Instructions for performing the control method described in timing diagram 500 may be executed by a controller (e.g., the controller 126 and/or the BECM 150) based on instructions stored on a memory of the controller and in conjunction with sensory feedback received from components of a system (e.g., the plug-in vehicle 100) in which the high-voltage multi-array battery is integrated, including current measurement sensors, voltage measurement sensors, and temperature measurement sensors (e.g., sensor module 208). In the prophetic example, the controller determines whether the rate of change of a difference in a maximum cell voltage deviation for at least one array of cells of the high-voltage multi-array battery is greater than the predetermined threshold using voltages of battery cells of the high-voltage multi-array battery. In response to the rate of change exceeding the predetermined threshold, the controller may execute abortion of plug-in charging and recording of a DTC in a memory of the controller. In FIG. 5, the horizontal axis denotes time and vertical markers t0-t5 identify relevant times in the timing diagram 500 for high-voltage multi-array battery control.

Timing diagram 500 shows plots 502, 504, 506, 508, 510, 512, and 514, which illustrate states of components and/or control settings of a vehicle system (e.g., the plug-in vehicle 100) over time. Plot 502 indicates a voltage of each battery cell of an array, wherein each of plots 502a, 502b, 502c, 502d, 502e, and 502f represents a battery cell of the array. Plot 504 indicates an instantaneous maximum cell voltage deviation for the array. For example, as described with respect to operation 402 of the method 400, the instantaneous maximum cell voltage deviation is calculated by identifying a voltage of each cell of the array (e.g., as shown in plot 502), identifying cells of the array having a maximum and a minimum voltage of the array, identifying an average voltage of cells in the array excluding the cells having the maximum and minimum voltages, and identifying a maximum difference between a cell voltage and the average voltage of cells in the array. Plot 506 indicates a rate of change of a difference in a maximum cell voltage deviation for at least one array of cells of the high-voltage multi-array battery. As described with respect to FIG. 4, the rate of change shown in plot 506 is a difference between an instantaneous maximum cell voltage deviation (e.g., plot 504) and a historic moving average. A first threshold 516 is indicated in plot 506. The first threshold 516 is a non-zero positive value threshold, and is the predetermined threshold described above which, when exceeded by the rate of change (e.g., plot 506), causes the controller to abort plug-in charging and record a diagnostic trouble code (DTC) in a memory of the vehicle. The plot 508 illustrates an increment counter which is a count of integers recording each time the rate of change (e.g., plot 506) is determined to be greater than the predetermined threshold (e.g., the first threshold 516). The plot 508 includes a second threshold 518 which is a non-zero positive value threshold increment counter. In the example of FIG. 5, when the rate of change (e.g., plot 506) exceeds the predetermined threshold (e.g., the first threshold 516) a number of times equal to the second threshold 518, plug-in charging is aborted and a DTC is recorded in the memory of the plug-in vehicle. Plot 510 shows a state of plug-in charging of the plug-in vehicle. Plot 512 shows whether contacts of the high-voltage multi-array battery (e.g., contactor 142) are open (e.g., coupling the high-voltage multi-array battery to components of the plug-in vehicle such as the first electric machine 114 and the second electric machine 116) or closed (e.g., uncoupling the high-voltage multi-array battery from components of the plug-in vehicle). Plot 514 shows whether pins of the charge port (e.g., the second set of pins 156 of the charge port 134) are extended (e.g., to couple the charge port to the charge connector 140 to enable plug-in charging) or retracted (e.g., to prevent coupling of the charge port to the charge connector and disable plug-in charging).

From t0 to t1, voltages of battery cells of the array are approximately unchanged, thus an instantaneous maximum cell voltage deviation calculated as described with respect to equation 1 and operation 402 may be relatively unchanged. As the instantaneous maximum cell voltage deviation is relatively unchanged, the rate of change of the difference in a maximum cell voltage deviation is approximately zero. A value of the increment counter is at zero. Plug-in charging of the high-voltage multi-array battery is off. Contacts are closed, thus electrically coupling the high-voltage multi-array battery to components of the plug-in vehicle. Charge port pins are retracted, thus preventing electrical coupling of the high-voltage multi-array battery to an external power source (e.g., the external power source 136) via the charge connector coupling to the charge port. The plug-in vehicle may be off, therefore the voltages of the battery cells may not be decreasing.

At t1, plug-in charging of the high-voltage multi-array battery is actuated. Plug-in charging includes coupling the high-voltage multi-array battery to an external power source (e.g., the external power source 136) via the charge connector coupling to the charge port. Thus, charge port pins are extended to contact pins of the charge connector (e.g., the first set of pins 154). The contacts remain closed to enable power to be delivered from the charge port to the high-voltage multi-array battery. As plug-in charging begins, between t1 and t2, voltages of each battery cell increases. Voltages for battery cells demonstrated by plots 502a, 502b, 502c, 502e, and 502f gradually increase at approximately the same rate. Voltage of the battery cell demonstrated by plot 502d (shown in dashed line for clarity) increases by a rate significantly greater than that of the other battery cells of the array. The instantaneous maximum voltage of the array increases, which corresponds with a battery cell of the array (e.g., the battery cell shown by plot 502d) having a voltage which is greater than that of other battery cells of the array. The rate of change of a difference in a maximum cell voltage deviation for the array of cells also increases. For example, the rate of change (e.g., plot 506) may be calculated by comparing the $dV_{max}$ (e.g., plot 504) between t1-t2 and t0-t1.

At t2, as the $dV_{max}$ increases, the $\Delta dV_{max}$ increases to greater than the first threshold 516, which may indicate degradation of at least one battery cell of the array. The increment counter increases by one count. Between t2 and t3, plug-in charging continues and battery cell voltages shown by plots 502a, 502b, 502c, 502e, and 502f continue to increase. The voltage of the battery cell shown by plot 502d is approximately unchanged. Thus, between t2 and t3, $dV_{max}$ and $\Delta dV_{max}$ gradually decrease.

Between t3 and t4, voltages of the battery cells shown by plots 502a, 502b, 502d, 502e, and 502f are approximately unchanged. For example, the battery cells may be fully charged. Plug-in charging continues, and the plug-in vehicle may be off (e.g., no power demand on the high-voltage multi-array battery by electric machines or auxiliary components). Voltage of the battery cell shown by plot 502c (shown in dash dot dot line for clarity) decreases between t3 and t5. The instantaneous maximum voltage deviation of the array increases, corresponding to a battery cell of the array (e.g., the battery cell shown by plot 502d) having a voltage which is differs from that of other battery cells of the array. As described with respect to the method 400, calculating the instantaneous maximum voltage deviation includes calculating the absolute value of the maximum voltage, therefore the instantaneous maximum voltage is shown as a positive number when the voltage of the battery cell is decreasing. The rate of change of the difference in the maximum cell voltage deviation for the array of cells also increases.

At t4, as the $dV_{max}$ increases, the $\Delta dV_{max}$ again increases to greater than the first threshold 516, which may indicate degradation of at least one battery cell of the array. The increment counter increases by one count to two. In the embodiment of FIG. 5, when the value of the increment counter equals the count threshold (e.g., the second threshold 518), plug-in charging of the plug-in vehicle is aborted. At t5, plug-in charging is aborted, contacts are actuated to an open position, and charge port pins are retracted, thus electrically uncoupling the high-voltage multi-array battery from the external power source. As described herein, the method may further include recording a DTC in a memory of the plug-in vehicle, outputting a notification indicating plug-in charging has been aborted, and monitoring for a thermal event.

In this way, an efficiency of plug-in charging for a high-voltage multi-array battery of a plug-in vehicle may be increased, and a useable life of battery cells of the high-voltage multi-array battery may be increased. By decreasing a number of calculations used to monitor battery cell voltages, a time to detect battery cell degradation may be decreased and plug-in charging may be halted earlier compared to conventional methods. Recording a DTC and outputting a notification may indicate to a user a potential battery cell degradation event prior to the battery cell degradation advancing to a level which affects additional elements of vehicle operation. Additionally, automatically aborting plug-in charging when potential degradation of one or more battery cells is detected via the rate of change may increase the efficiency of plug in charging by halting power delivery to a battery cell which may not be storing power. The technical effect of monitoring battery cell degradation in a high-voltage multi-array battery is reduced time to detect degradation, increased computational efficiency (e.g., reduced number of calculations), and increased charging efficiency.

The disclosure also provides support for a method for detecting battery cell degradation during plug-in charging of a high-voltage multi-array battery of a vehicle, the method comprising: in response to a rate of change of a difference in a maximum cell voltage deviation for at least one array of cells of the high-voltage multi-array battery exceeding a predetermined threshold, aborting plug-in charging and recording a diagnostic trouble code (DTC) in a memory of the vehicle. In a first example of the method, the rate of change of the difference in the maximum cell voltage deviation is a difference between an instantaneous maximum cell voltage deviation and a historic moving average of a maximum cell voltage deviation. In a second example of the method, optionally including the first example, the instantaneous maximum cell voltage deviation is calculated by: identifying a voltage of each cell in an array of the high-voltage multi-array battery, identifying a first cell of the array having a maximum voltage of cells in the array, identifying a second cell of the array having a minimum voltage of cells in the array, and calculating an average voltage of the array, excluding the first cell and the second cell from the average voltage. In a third example of the method, optionally including one or both of the first and second examples, calculating the instantaneous maximum cell voltage deviation includes calculating a change in cell voltage delta in an array of the high-voltage multi-array battery, rather than calculating a derivative on each cell voltage of each cell in each array of cells of the high-voltage multi-array battery. In a fourth example of the method, optionally including one or more or each of the first through third examples, a count of instances where the rate of change of a difference in a maximum cell voltage deviation exceeds the predetermined threshold is recorded, and the plug-in charging is aborted and the DTC is recorded in response to the count exceeding a count threshold. In a fifth example of the method, optionally including one or more or each of the first through fourth examples, the method further comprises: in response to the rate of change of a difference in a maximum cell voltage deviation for at least one array of cells of the high-voltage multi-array battery exceeding the predetermined threshold, performing a battery power off of the high-voltage multi-array battery. In a sixth example of the method, optionally including one or more or each of the first through fifth examples, the method further comprises: enabling a no-restart action of the high-voltage multi-array battery for a first duration of time in response to the rate of change of the difference in the maximum cell voltage deviation for at least one array of cells of the high-voltage multi-array battery exceeding the predetermined threshold. In a seventh example of the method, optionally including one or more or each of the first through sixth examples, the method further comprises: monitoring the high-voltage multi-array battery for a potential thermal event and outputting a notification indicating demand for external thermal monitoring in response to the rate of change of the difference in the maximum cell voltage deviation for at least one array of cells of the high-voltage multi-array battery exceeding the predetermined threshold. In an eighth example of the method, optionally including one or more or each of the first through seventh examples, monitoring for a potential thermal event includes monitoring a temperature and a temperature rate of change of the high-voltage multi-array battery and, in response to the temperature exceeding a temperature threshold, or the temperature rate of change exceeding a temperature rate of change threshold, outputting a thermal event notification to a display device and recording a thermal DTC in the memory of the vehicle.

The disclosure also provides support for a plug-in vehicle, comprising: a charge port, a high-voltage multi-array battery, a power conversion module selectively coupling the charge port to the high-voltage multi-array battery, and a battery energy control module (BECM) including instructions stored in non-transitory memory that, when executed, cause the BECM calculate a first parameter representing an instantaneous maximum cell voltage deviation for each array of cells of the high-voltage multi-array battery, calculate a second parameter representing a rate of change of the first parameter based on a difference between the first parameter and a historic moving average of the first parameter, and in response to the second parameter for at least one array of cells of the high-voltage multi-array battery exceeding a predetermined threshold, abort plug-in charging and record a diagnostic trouble code (DTC) in a memory of the plug-in vehicle. In a first example of the system, each array of the high-voltage multi-array battery includes multiple cells, and maximum cell voltage deviation is calculated for each array by calculating a maximum value of difference between a battery cell voltage for a first cell of an array and an average voltage of battery cells of the array excluding the first cell, a second cell having a maximum voltage, and a third cell having a minimum voltage. In a second example of the system, optionally including the first example, aborting the plug-in charging includes adjusting the power conversion module to halt power, supplied to the charge port by a charger, from being delivered to the high-voltage multi-array battery. In a third example of the system, optionally including one or both of the first and second examples, aborting the plug-in charging and recording the DTC further comprises outputting a notification to a display device, the notification indicating that plug-in charging has been aborted. In a fourth example of the system, optionally including one or more or each of the first through third examples, aborting the plug-in charging further includes adjusting a configuration of the charge port to disconnect a charge connector from the charge port. In a fifth example of the system, optionally including one or more or each of the first through fourth examples, aborting the plug-in charging further includes adjusting a configuration of the charge port to prevent connection of a charge connector to the charge port for a first duration of time.

The disclosure also provides support for a method for operating a multi-array battery pack of a vehicle, comprising: for each array of the multi-array battery pack, calculating a first parameter representing a change in instantaneous maximum cell voltage deviation by calculating a maximum value of a difference between a battery cell voltage for a first cell of an array and an average voltage of remaining cells of the array, excluding the first cell, a second cell of the array having a maximum voltage, and a third cell of the array having a minimum voltage, calculating a second parameter representing a difference between the change in instantaneous maximum cell voltage deviation and a change in historic moving average cell voltage deviation of the array, in response to the second parameter exceeding a predetermined threshold, add one value to a count of integers, and in response to the count of integers exceeding a count threshold, aborting plug-in charging and recording a diagnostic trouble code (DTC) in a memory of the vehicle. In a first example of the method, the method further comprises: in response to the count of integers exceeding the count threshold, disabling plug-in charging and power output by the multi-array battery pack for a first duration of time. In a second example of the method, optionally including the first example, the predetermined threshold represents a battery cell voltage above which a temperature of the multi-array battery pack exceeds an operational temperature. In a third example of the method, optionally including one or both of the first and second examples, the method further comprises: in response to the count of integers exceeding the count threshold, monitoring the multi-array battery pack for a potential thermal event by continuously comparing a temperature of each array of the multi-array battery pack to a temperature threshold and, in response to the temperature exceeding the temperature threshold, discharging the multi-array battery pack, outputting a thermal event notification to a display device, and recording a thermal DTC in the memory of the vehicle. In a fourth example of the method, optionally including one or more or each of the first through third examples, the method further comprises: in response to the count of integers exceeding the count threshold, monitoring the multi-array battery pack for a potential thermal event by continuously comparing a temperature rate of change of each array of the multi-array battery pack to a temperature rate of change threshold and, in response to the temperature rate of change exceeding the temperature rate of change threshold, discharging the multi-array battery pack, outputting a thermal event notification to a display device, and recording a thermal DTC in the memory of the vehicle.

FIGS. 1-2 show example configurations with relative positioning of the various components. Unless otherwise noted, if shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Unless explicitly stated to the contrary, the terms "first," "second,"

"third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for detecting battery cell degradation during plug-in charging of a high-voltage multi-array battery of a vehicle, the method comprising:
in response to a rate of change of a difference in a maximum cell voltage deviation for at least one array of cells of the high-voltage multi-array battery exceeding a predetermined threshold, aborting plug-in charging and recording a diagnostic trouble code (DTC) in a memory of the vehicle, and wherein the rate of change of the difference in the maximum cell voltage deviation is a difference between an instantaneous maximum cell voltage deviation and a historic moving average of a maximum cell voltage deviation.

2. The method of claim 1, wherein the instantaneous maximum cell voltage deviation is calculated by:
identifying a voltage of each cell in an array of the high-voltage multi-array battery;
identifying a first cell of the array having a maximum voltage of cells in the array;
identifying a second cell of the array having a minimum voltage of cells in the array; and
calculating an average voltage of the array, excluding the first cell and the second cell from the average voltage.

3. The method of claim 1, wherein calculating the instantaneous maximum cell voltage deviation includes calculating a change in cell voltage delta in an array of the high-voltage multi-array battery, rather than calculating a derivative on each cell voltage of each cell in each array of cells of the high-voltage multi-array battery.

4. The method of claim 1, wherein a count of instances where the rate of change of a difference in a maximum cell voltage deviation exceeds the predetermined threshold is recorded, and the plug-in charging is aborted and the DTC is recorded in response to the count exceeding a count threshold.

5. The method of claim 1, further comprising, in response to the rate of change of a difference in a maximum cell voltage deviation for at least one array of cells of the high-voltage multi-array battery exceeding the predetermined threshold, performing a battery power off of the high-voltage multi-array battery.

6. The method of claim 5, further comprising enabling a no-restart action of the high-voltage multi-array battery for a first duration of time in response to the rate of change of the difference in the maximum cell voltage deviation for at least one array of cells of the high-voltage multi-array battery exceeding the predetermined threshold.

7. The method of claim 1, further comprising monitoring the high-voltage multi-array battery for a potential thermal event and outputting a notification indicating demand for external thermal monitoring in response to the rate of change of the difference in the maximum cell voltage deviation for at least one array of cells of the high-voltage multi-array battery exceeding the predetermined threshold.

8. The method of claim 7, wherein monitoring for a potential thermal event includes monitoring a temperature and a temperature rate of change of the high-voltage multi-array battery and, in response to the temperature exceeding a temperature threshold, or the temperature rate of change exceeding a temperature rate of change threshold, outputting a thermal event notification to a display device and recording a thermal DTC in the memory of the vehicle.

9. A plug-in vehicle, comprising:
a charge port;
a high-voltage multi-array battery;
a power conversion module selectively coupling the charge port to the high-voltage multi-array battery; and
a battery energy control module (BECM) including instructions stored in non-transitory memory that, when executed, cause the BECM calculate a first parameter representing an instantaneous maximum cell voltage deviation for each array of cells of the high-voltage multi-array battery, calculate a second parameter representing a rate of change of the first parameter based on a difference between the first parameter and a historic moving average of the first parameter, and in response to the second parameter for at least one array of cells of the high-voltage multi-array battery exceeding a predetermined threshold, abort plug-in charging and record a diagnostic trouble code (DTC) in a memory of the plug-in vehicle.

10. The plug-in vehicle of claim 9, wherein each array of the high-voltage multi-array battery includes multiple cells, and maximum cell voltage deviation is calculated for each array by calculating a maximum value of difference between a battery cell voltage for a first cell of an array and an average voltage of battery cells of the array excluding the first cell, a second cell having a maximum voltage, and a third cell having a minimum voltage.

11. The plug-in vehicle of claim 9, wherein aborting the plug-in charging includes adjusting the power conversion module to halt power, supplied to the charge port by a charger, from being delivered to the high-voltage multi-array battery.

12. The plug-in vehicle of claim 9, wherein aborting the plug-in charging and recording the DTC further comprises outputting a notification to a display device, the notification indicating that plug-in charging has been aborted.

13. The plug-in vehicle of claim 9, wherein aborting the plug-in charging further includes adjusting a configuration of the charge port to disconnect a charge connector from the charge port.

14. The plug-in vehicle of claim 9, wherein aborting the plug-in charging further includes adjusting a configuration of the charge port to prevent connection of a charge connector to the charge port for a first duration of time.

15. A method for operating a multi-array battery pack of a vehicle, comprising:

for each array of the multi-array battery pack, calculating a first parameter representing a change in instantaneous maximum cell voltage deviation by calculating a maximum value of a difference between a battery cell voltage for a first cell of an array and an average voltage of remaining cells of the array, excluding the first cell, a second cell of the array having a maximum voltage, and a third cell of the array having a minimum voltage;

calculating a second parameter representing a difference between the change in instantaneous maximum cell voltage deviation and a change in historic moving average cell voltage deviation of the array;

in response to the second parameter exceeding a predetermined threshold, add one value to a count of integers; and in response to the count of integers exceeding a count threshold, aborting plug-in charging and recording a diagnostic trouble code (DTC) in a memory of the vehicle.

16. The method of claim 15, further comprising, in response to the count of integers exceeding the count threshold, disabling plug-in charging and power output by the multi-array battery pack for a first duration of time.

17. The method of claim 15, wherein the predetermined threshold represents a battery cell voltage above which a temperature of the multi-array battery pack exceeds an operational temperature.

18. The method of claim 15, further comprising, in response to the count of integers exceeding the count threshold, monitoring the multi-array battery pack for a potential thermal event by continuously comparing a temperature of each array of the multi-array battery pack to a temperature threshold and, in response to the temperature exceeding the temperature threshold, discharging the multi-array battery pack, outputting a thermal event notification to a display device, and recording a thermal DTC in the memory of the vehicle.

19. The method of claim 15, further comprising, in response to the count of integers exceeding the count threshold, monitoring the multi-array battery pack for a potential thermal event by continuously comparing a temperature rate of change of each array of the multi-array battery pack to a temperature rate of change threshold and, in response to the temperature rate of change exceeding the temperature rate of change threshold, discharging the multi-array battery pack, outputting a thermal event notification to a display device, and recording a thermal DTC in the memory of the vehicle.

* * * * *